US012770813B2

(12) United States Patent
Mleczko et al.

(10) Patent No.: US 12,770,813 B2
(45) Date of Patent: Oct. 20, 2026

(54) SOLID STATE RELAY MODULE

(71) Applicant: Aptiv Technologies AG, Schaffhausen (CH)

(72) Inventors: Jamie Mleczko, Oxford, MI (US); Cheuk Ng, Troy, MI (US); Yu Li, Troy, MI (US)

(73) Assignee: Aptiv Technologies AG, Schaffhausen (CH)

( * ) Notice: Subject to any disclaimer, the term of this patent is extended or adjusted under 35 U.S.C. 154(b) by 313 days.

(21) Appl. No.: 18/632,660

(22) Filed: Apr. 11, 2024

(65) Prior Publication Data

US 2024/0347296 A1 Oct. 17, 2024

Related U.S. Application Data

(60) Provisional application No. 63/459,414, filed on Apr. 14, 2023, provisional application No. 63/459,446, filed on Apr. 14, 2023.

(51) Int. Cl.

| | |
|---|---|
| ***H01H 50/02*** | (2006.01) |
| ***H01H 45/14*** | (2006.01) |
| ***H01H 50/12*** | (2006.01) |

(52) U.S. Cl.
CPC .......... *H01H 50/021* (2013.01); *H01H 45/14* (2013.01); *H01H 50/12* (2013.01)

(58) Field of Classification Search
CPC ...... H01H 50/021; H01H 45/14; H01H 50/12; H03K 17/6871; H03K 17/0822; H10W 40/10; H05K 7/20454
See application file for complete search history.

(56) References Cited

U.S. PATENT DOCUMENTS 6,154,369 A * 11/2000 Martinez, Jr. ...... H05K 7/20254 361/719
9,763,360 B2 9/2017 Dorenkamp et al.
12,439,543 B2 * 10/2025 Lu .......................... H05K 1/145
(Continued)

FOREIGN PATENT DOCUMENTS

WO 2022175107 A1 8/2022

OTHER PUBLICATIONS

"Extended European Search Report Received for Application No. 24170058.2"; European Patent Office; mailed on Sep. 9, 2024; 8 Pages.

*Primary Examiner* — Stephen S Sul
(74) *Attorney, Agent, or Firm* — Billion & Armitage

(57) ABSTRACT

A solid state relay (SSR) module may include a first solid state switch configured to establish and break an electrical connection between an input terminal and an output terminal. The module includes an electronic controller configured to turn the first solid state switch on or off and a top cover formed of an electrically insulative thermoplastic material. The power circuit board is disposed within a cavity in the top cover. The top cover defines openings through which the input and output terminals extend. The module also includes a thermally conductive bottom cover in thermal communication with the first solid state switch, a compliant thermal interface paste disposed between the bottom cover and the first solid state switch, and a resilient thermal interface pad attached to the bottom cover by an adhesive layer on the resilient thermal interface pad.

20 Claims, 8 Drawing Sheets

(56) References Cited

U.S. PATENT DOCUMENTS

| | | | | |
|---|---|---|---|---|
| 2004/0246662 | A1* | 12/2004 | Thurk | H02M 1/44 361/703 |
| 2017/0013740 | A1* | 1/2017 | Mergener | H02K 7/145 |
| 2018/0199472 | A1* | 7/2018 | Nakanishi | H05K 7/20963 |
| 2019/0296731 | A1 | 9/2019 | Sakai | |
| 2022/0167526 | A1* | 5/2022 | Xu | H05K 7/2049 |
| 2022/0263502 | A1 | 8/2022 | Zhang et al. | |
| 2022/0354014 | A1* | 11/2022 | Feurtado | H05K 7/1432 |
| 2022/0361316 | A1* | 11/2022 | Azizian | H05K 7/2039 |

* cited by examiner

SOLID STATE RELAY MODULE

CROSS-REFERENCE TO RELATED APPLICATIONS

This application claims the benefit of and priority to U.S. Provisional Application 63/459,414, titled "Miniature Solid State Relay Module", filed Apr. 14, 2023, and U.S. Provisional Application 63/459,446, titled "Miniature Solid State Relay Module", also filed Apr. 14, 2023, the contents of each of which are incorporated herein by reference.

TECHNICAL FIELD

This disclosure is directed to an electrical relay module, and more particularly to a solid state relay module with overcurrent protection.

BACKGROUND

Mechanical contactors are heavy-duty relays that are used as switches to open and close electrical circuits in high-voltage, e.g., greater than 50 volt, applications. However, mechanical contactors are slow and have a limited lifespan ending in mechanical or electrical failure of the contactors. These failures may increase costs of warranty claims for manufacturers using these mechanical devices.

SUMMARY

In some aspects, the techniques described herein relate to a solid state relay module that includes a first solid state switch, an electronic controller, a top cover, and a bottom cover. The first solid state switch is configured to establish and break an electrical connection between a first high-voltage input terminal and a first high-voltage output terminal disposed on a power circuit board. The electronic controller is in communication with the first solid state switch and configured to put the first solid state switch in a conductive state or in a nonconductive state. The top cover is formed of an electrically insulative thermoplastic material, wherein the power circuit board is disposed within a cavity defined by the top cover and wherein the top cover defines a plurality of openings through which the first high-voltage input terminal and the first high-voltage output terminal extend. The bottom cover is formed of a thermally conductive material and is in thermal communication with the first solid state switch. A compliant thermal interface paste is disposed between an inner surface of the bottom cover and surfaces of the first solid state switch and a resilient thermal interface pad is attached to an outer surface of the bottom cover by a first adhesive layer on an inner surface of the resilient thermal interface pad.

BRIEF DESCRIPTION OF THE DRAWINGS

The present invention will now be described by way of example with reference to the accompanying drawings, in which.

DETAILED DESCRIPTION

Described herein is a miniature solid state relay module, hereafter referred to as the SSR module, which is well suited for high-voltage automotive applications. The SSR module may be integrated into another device (but need not to be) and therefore size, connections, cost, and thermal management are significant parameters when considering packaging for the SSR module. To optimize each of these parameters, the SSR module may be contained in an electrically insulated housing. This package contains the parts for environed protection of the electrical components, structural support, and thermal dissipation. The SSR module presented herein has a smaller size and lower manufacturing costs than previous relay modules.

The SSR module includes a power printed circuit board (PCB) with threaded post connections for the power terminals. The SSR module uses top side cooled metal-oxide-semiconductor field-effect transistors (MOSFETs) that allows these devices to be cooled by conduction to a cold plate located exterior to the SSR module. The MOSFETs are attached to the PCB. In some embodiments the overmolded package may fully encapsulate the MOSFETs for mechanical protection and electrical isolation. In other embodiments, the overmolded package may leave the thermal dissipation surface of the MOSFETs exposed for reduced thermal impedance between the SSR module and the cold plate. In other embodiments, standard MOSFETs without cooling features alternatively may be used. The SSR module may also include snubber resistors and snubber capacitors also mounted on the PCB.

In contrast to traditional mechanical relays or contactors which use spring loaded terminals, the SSR module has the advantage of having no moving mechanical parts. The electrical switching is carried out by solid state components, e.g., MOSFETs. These solid state components have much better reliability than the mechanical contactors. These solid state components also have much faster response time which may be enhanced by pre-charging techniques. These solid state components are easily resettable and are much smaller than equivalent mechanical contactors.

Figure 1:
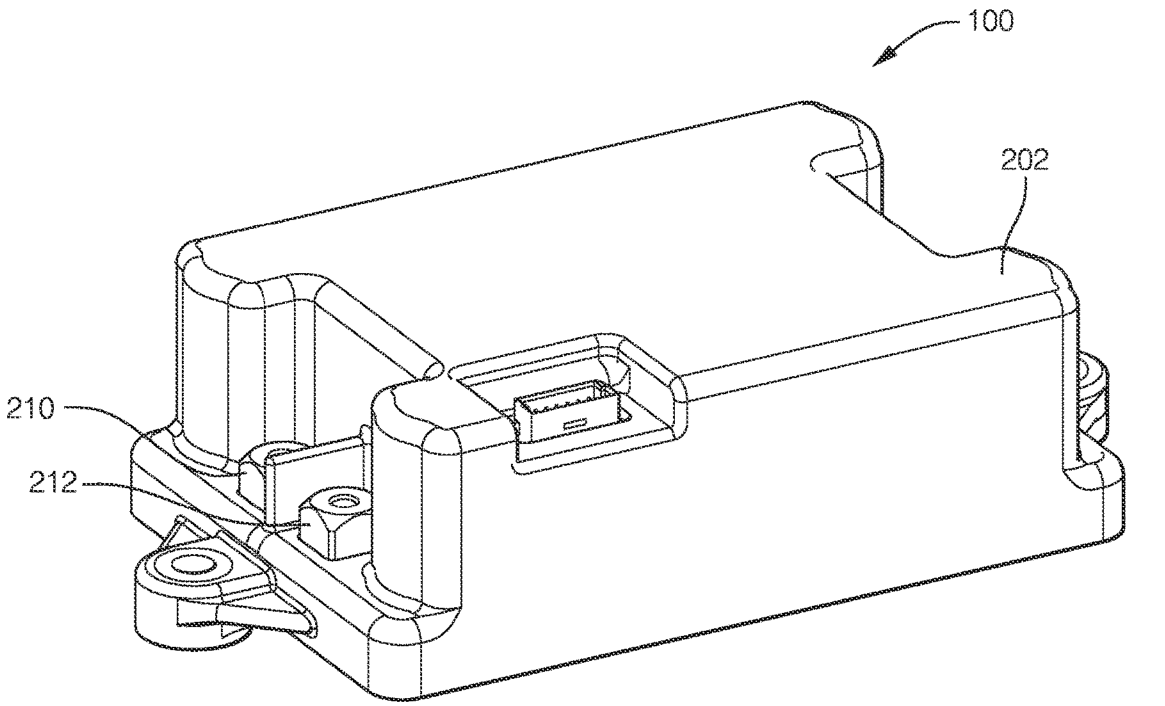
FIG. 1 illustrates an isometric view of a miniature solid state relay (SSR) module according to some embodiments.

FIG. 1 illustrates an isometric view of a non-limiting example of a miniature solid state relay module according to some embodiments, hereafter referred to as the SSR module 100.

Figure 2:
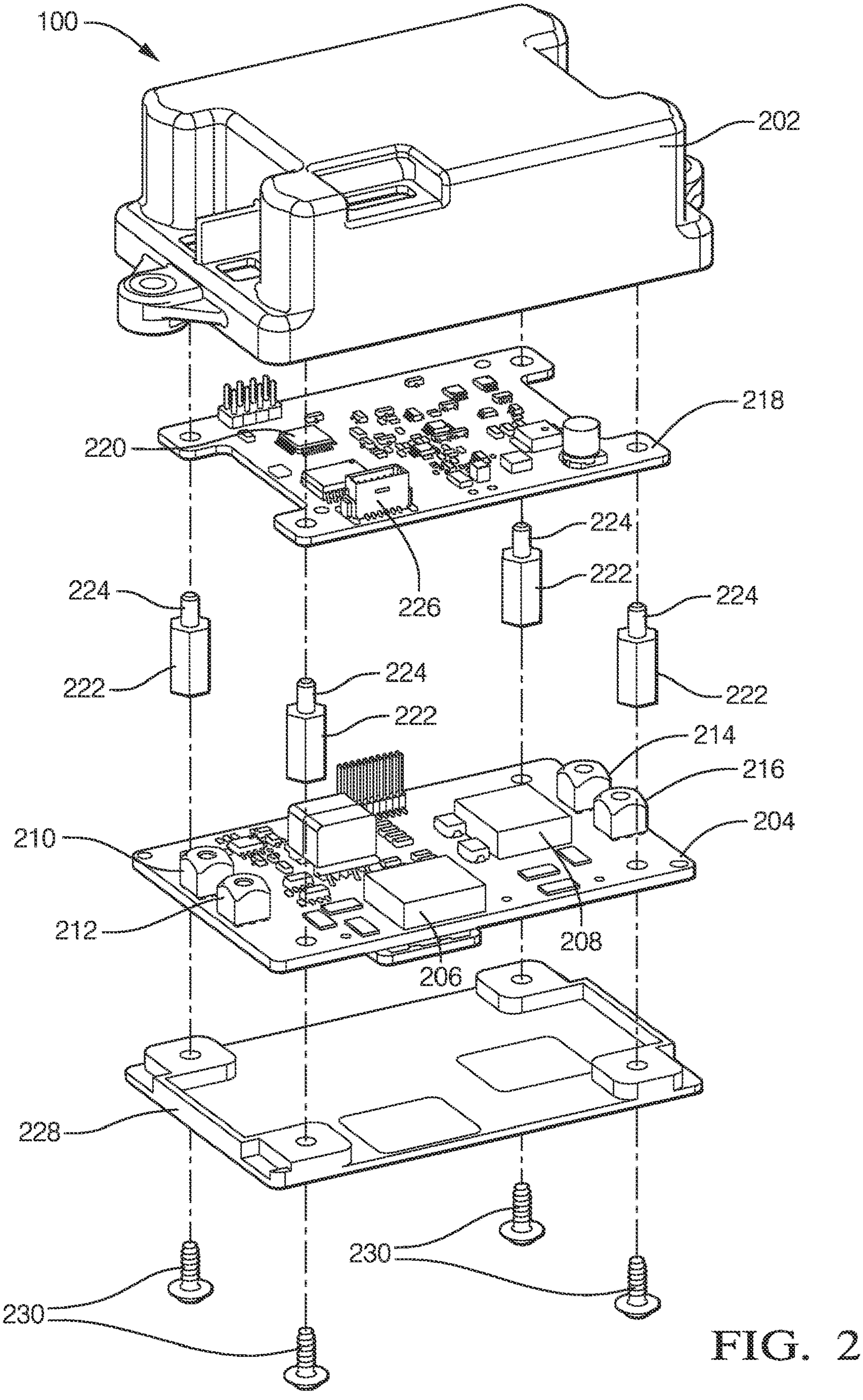
FIG. 2 illustrates an exploded view of the SSR module of FIG. 1 according to some embodiments.

FIG. 2 shows an exploded view of the SSR module 100 which includes a top cover 202 formed of an electrically insulative thermoplastic material, e.g. polyamine or polybutylene terephthalate. A power circuit board 204 having first and second solid state switches 206, 208, e.g., metal-oxide-semiconductor field-effect transistors (MOSFETs) is disposed within a cavity defined by the top cover 202. The power circuit board 204 also has first and second high-voltage input terminals 210, 212 that are configured to be connected to a high-voltage electrical power source, such as a battery pack and first and second high-voltage output terminals 214, 216 that are configured to be connected to an electrical load, such as a DC to AC invertor, a DC-DC convertor, or a primarily resistive load, e.g., a heater. The terminals 210-216 may be connected to the high-voltage electrical power source and the electrical load by busbars (not shown) connected to the terminals 210-216.

The SSR module also includes a control circuit board 218 disposed within the cavity in the top cover 202. The control circuit board 218 has an electronic controller 220 configured to switch the first and second solid state switches 206, 208 on and off to provide electrical power from the power source to the electrical load, pre-charge the electrical load, and/or protect the SSR module 100 from damage from overcurrent conditions.

The control circuit board 218 is electrically connected to the power circuit board 204 by an interface connector and is mechanically connected to the power circuit board 204 by a plurality of standoffs 222. In this example, the standoffs 222 define studs 224 that extend through holes in the corners of the control circuit board 218 to attach the control circuit board 218 to the top cover 202. The studs 224 may be threaded and screw into the top cover 202 or may be smooth and are press fit into holes in the top cover.

The control circuit board 218 also includes a connector 226 having a plurality of low-voltage terminals extending from the control circuit board 218. As used herein, high voltage describes voltages greater than or equal to 50 volts and low-voltage describes voltages less than 50 volts. The top cover 202 defines an aperture through which the plurality of low-voltage terminals may be accessed. The connector 226 is attached to the top cover 202 via the control circuit board 218 rather than being directly attached to the top cover 202.

The SSR module 100 also includes a bottom cover 228 that encloses the power circuit board 204 and the control circuit board 218 within the top cover 202. The bottom cover 228 is formed of a thermally conductive material, such as aluminum. Threaded fasteners 230 are inserted into holes in the corners of the bottom cover 228. The threaded fasteners 230 further extend through holes in the power circuit board 204 and are received into threaded holes in the standoffs 222, thereby securing the bottom cover 228 and the power circuit board 204 to the top cover 202.

Figure 3:
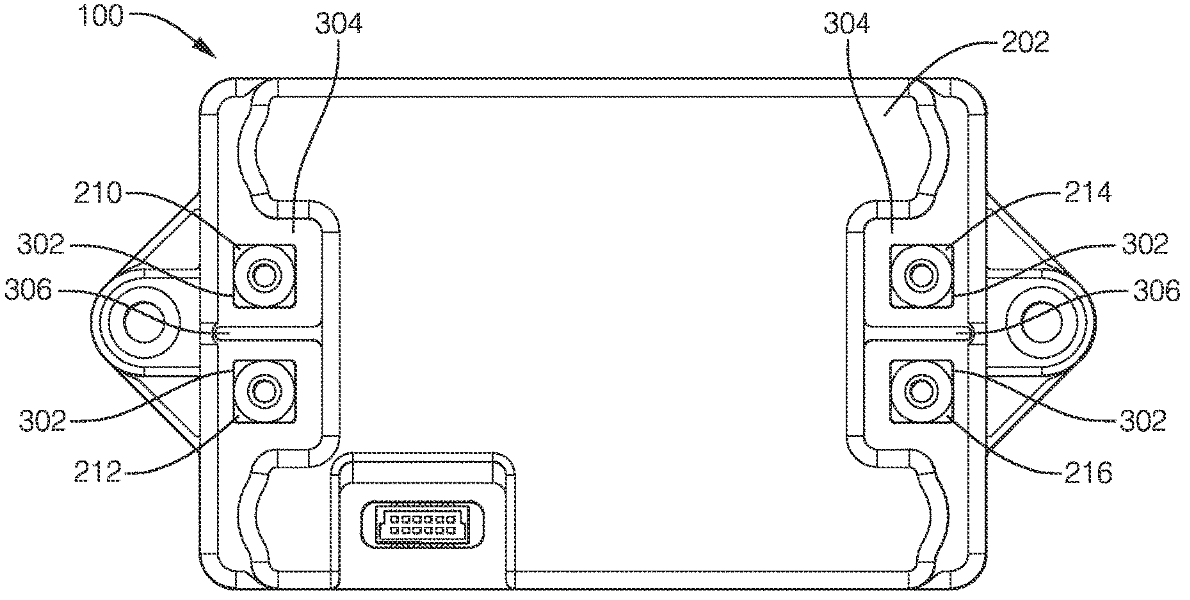
FIG. 3 illustrates a top view of the SSR module of FIG. 1 according to some embodiments.

FIG. 3 illustrates a top view of the SSR module 100. The top cover 202 defines openings 302 through with the input terminals 210, 212 and the output terminal 214, 216 protrude. The top cover 202 also defines grooves 304 in each of two opposing sides of the top cover 202 around the openings 302 that are configured to accommodate the bus bars attached to the input terminals 210, 212 and the output terminal 214, 216. In alternative embodiments, these grooves 304 may accommodate terminals at the ends of wire cables. The top cover 202 also defines walls 306 dividing at least a portion of the grooves 304 which separate the input terminals 210, 212 from one another and the output terminal 214, 216 from one another. The walls 306 electrically insulate the input terminals 210, 212 from one another and the output terminal 214, 216 from one another.

Figure 4:
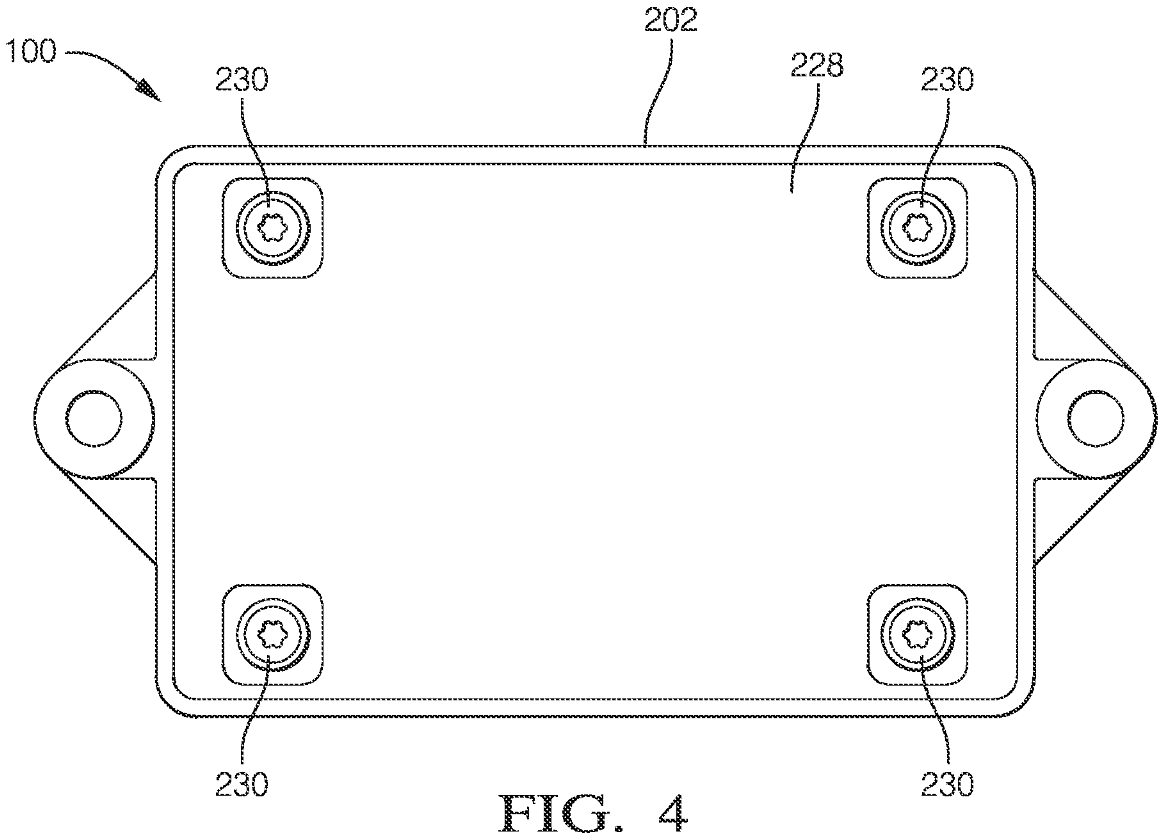
FIG. 4 illustrates a bottom view of the SSR module of FIG. 1 according to some embodiments.

FIG. 4 illustrates a bottom view of the SSR module 100 in which the top cover 202, the bottom cover 228, and the threaded fasteners 230 may be seen.

Figure 5:
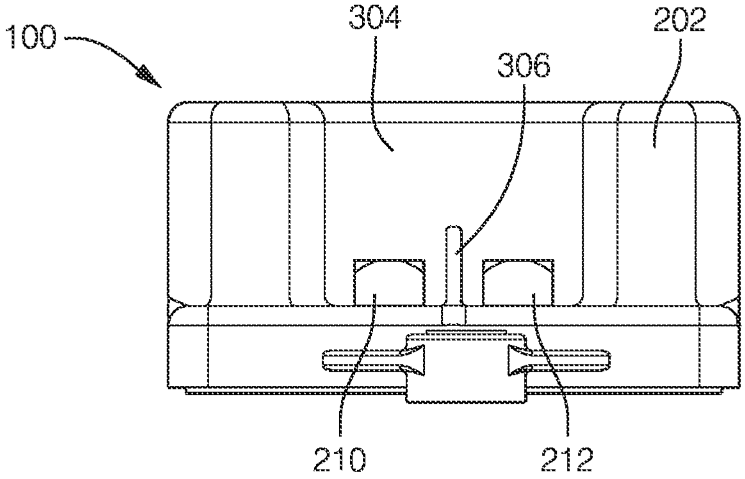
FIG. 5 illustrates a side view of the SSR module of FIG. 1 according to some embodiments.

FIG. 5 illustrates a side view of the SSR module 100 in which the top cover 202, the input terminals 210, 212, the bottom cover 228, the groove 304 and the wall 306 between the input terminals 210, 212 may be seen.

Figure 6:
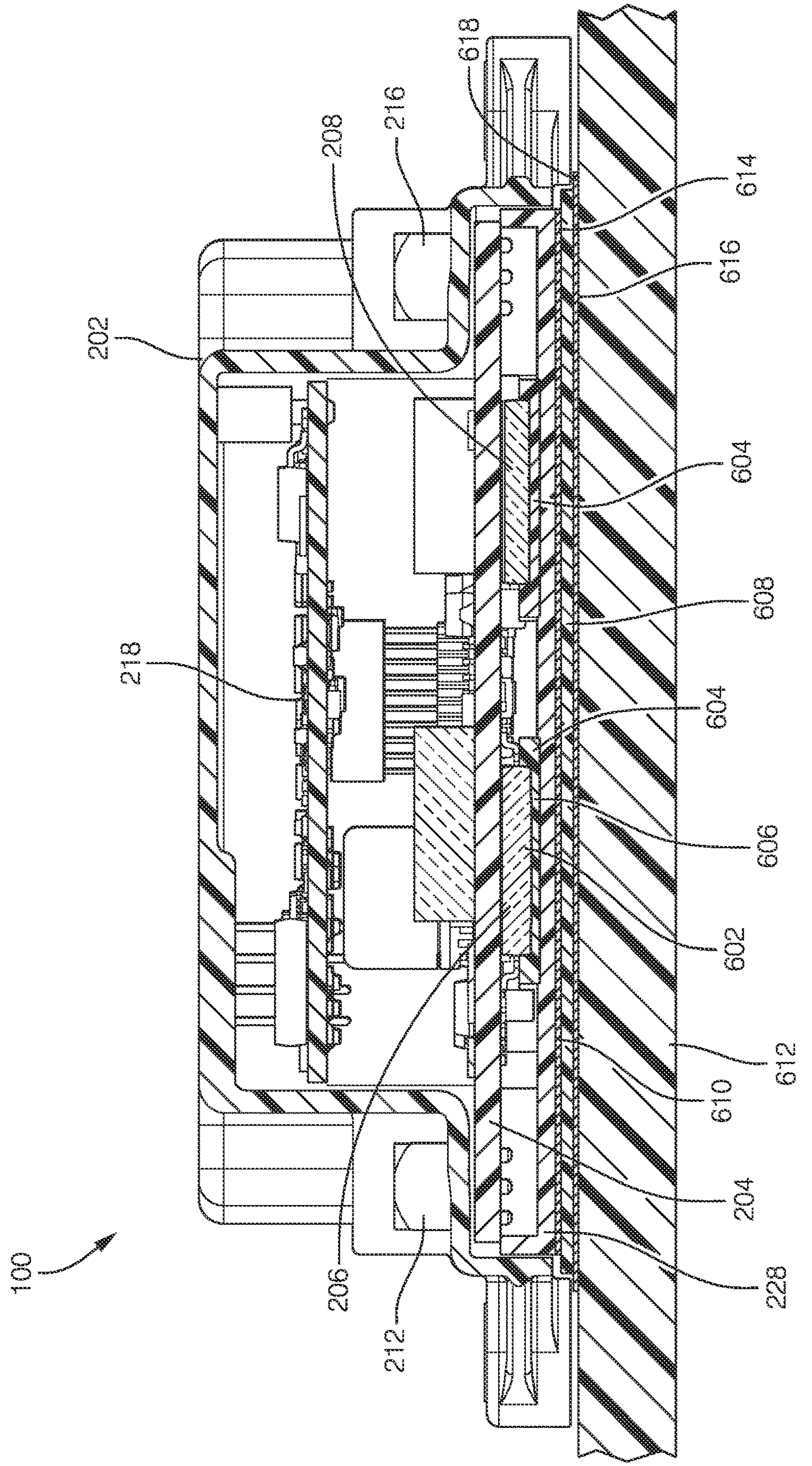
FIG. 6 illustrates a cross-section view of the SSR module of FIG. 1 according to some embodiments.

FIG. 6 illustrates a cross-section view of the SSR module 100. The first and second solid state switches 206, 208 generate waste heat that needs to be drawn out from the SSR module 100. The first and second solid state switches 206, 208 illustrated herein are MOSFET devices that have an integral heat sink 602, commonly referred to as a top-side cooling MOSFET. These heat sinks are 602 arranged on the bottom side of the power circuit board 204 so that they may provide optimal heat transfer from the first and second solid state switches 206, 208 to the bottom cover 228. As shown in FIG. 6, a compliant thermal interface paste 604 is disposed between an inner surface 606 of the bottom cover 228 and the heat sinks 602 of the first and second solid state switches 206, 208. The compliant thermal interface paste 604 may be a silicone or ceramic based thermal paste. The SSR module may also include a resilient thermal interface pad 608 on an outer surface 610 of the bottom cover 228 to increase the thermal conductivity between the bottom cover 228 and a cooling channel 612 to which the SSR module 100 may be mounted. The cooling channel 612 is separate from the SSR module 100 and is a heat sink for the SSR module 100 that contains a liquid or gaseous coolant flowing therethrough. An inner surface of the thermal interface pad 608 may be attached to the outer surface 610 of the bottom cover 228 by a first adhesive layer 614. An outer surface of the thermal interface pad 608 may be covered by a second adhesive layer 616 that is used to attach the thermal interface pad 608 to the cooling channel 612. The SSR module 100 may also include a removable protective film 618 over the second adhesive layer 616 that protects the second adhesive layer 616 until the SSR module 100 is mounted on the cooling channel 612.

Figure 7A:
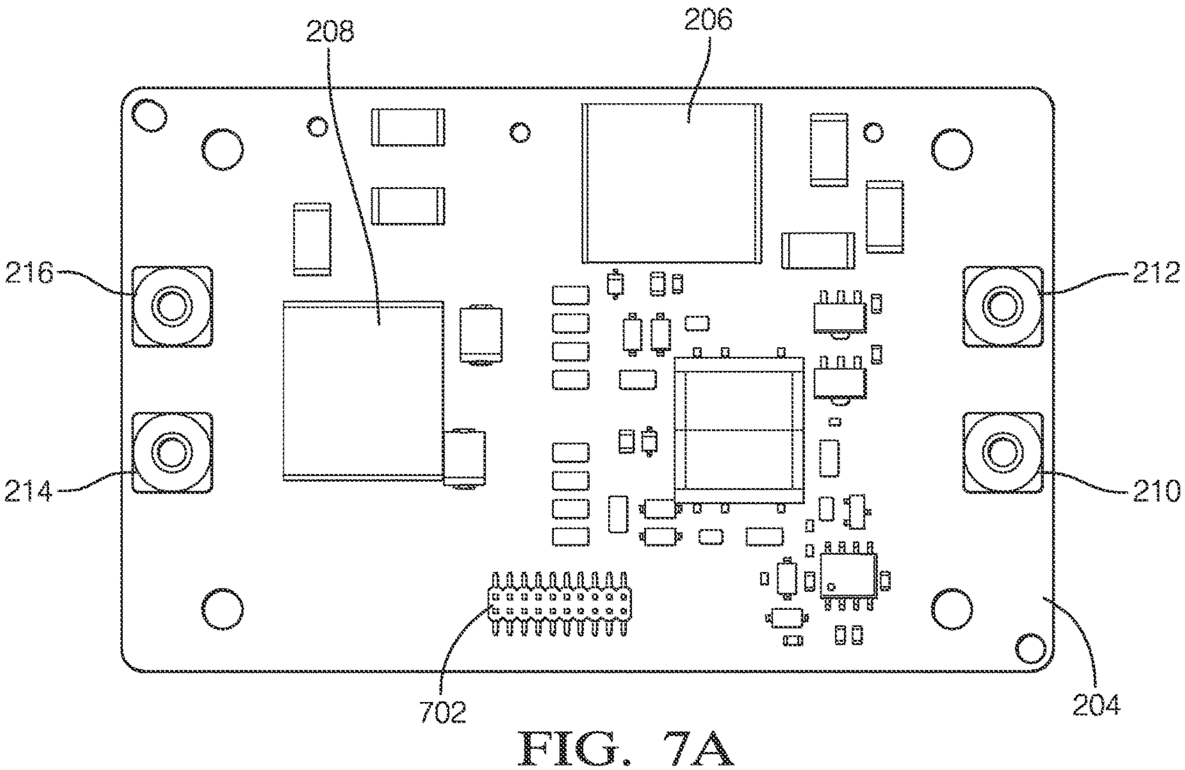
FIG. 7A illustrates a top view of a power circuit board of the SSR module of FIG. 1 according to some embodiments.

FIG. 7A illustrates a top view of a power circuit board 204. The top side of the power circuit board 204 contains the first and second high-voltage input terminals 210, 212, the first and second high-voltage output terminals 214, 216, and various other electronic components, such as resistors, capacitors, diodes and transistors. The top side of the power circuit board 204 also includes a male pin board to board connector 702 that is configured to connect the power circuit board 204 to the control circuit board 218.

Figure 7B:
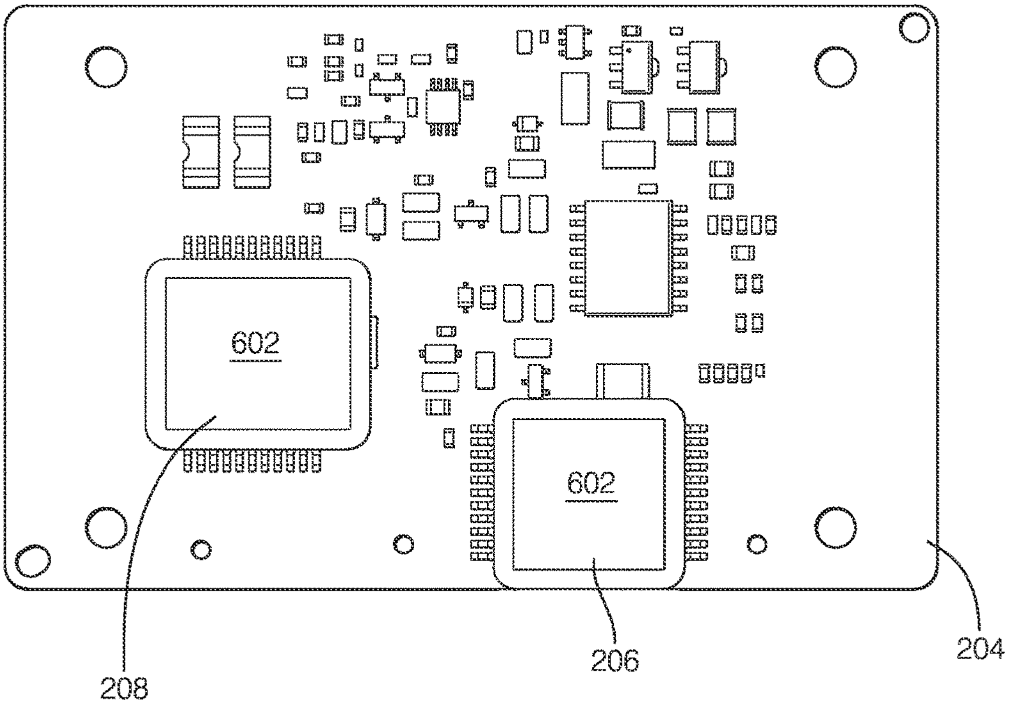
FIG. 7B illustrates a bottom view of the power circuit board of FIG. 7A according to some embodiments.

FIG. 7B illustrates a bottom view of the power circuit board 204. The bottom side of the power circuit board contains the first and second solid state switches 206, 208. The integral heat sinks 602 are on the are on the bottom side of the power circuit board 204 so that they may be in thermal contact with the bottom cover 228. As can be seen in FIG. 7A, the first and second solid state switches 206, 208 extend from the bottom side of the power circuit board 204 through cut outs in the power circuit board 204. The bottom side of the power circuit board 204 also contains various other electronic components, such as resistors, capacitors, diodes and transistors.

Figure 8A:
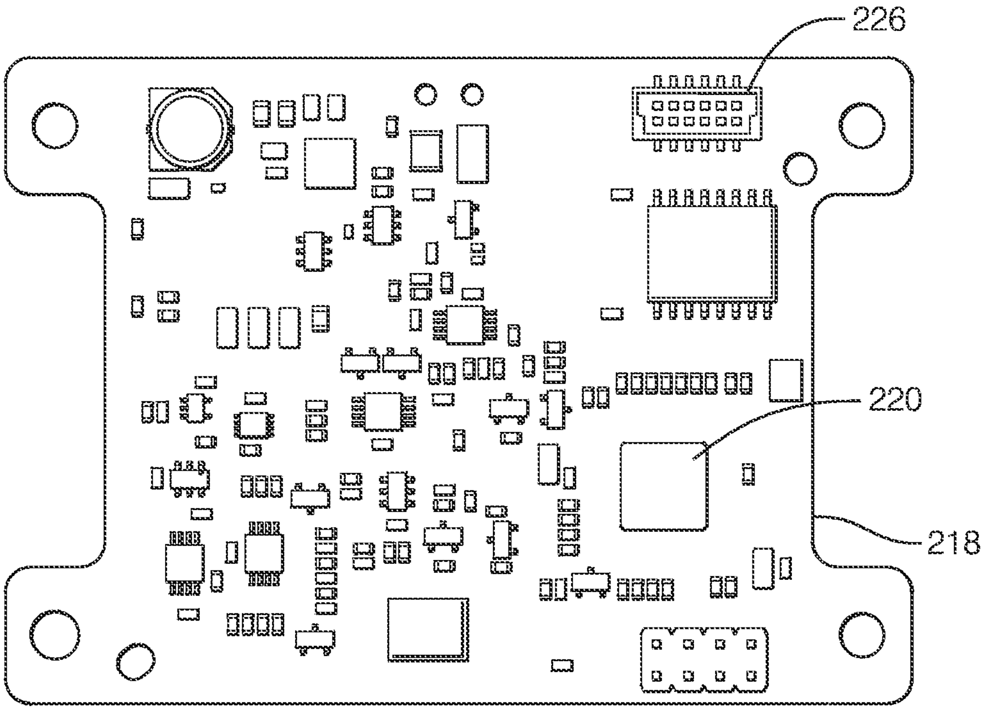
FIG. 8A illustrates a top view of a control circuit board of the SSR module of FIG. 1 according to some embodiments.

FIG. 8A illustrates a top view of a control circuit board 218. The top side of the control circuit board 218 includes the electronic controller 220 and the connector 226 as well as various other electronic components, such as resistors, capacitors, diodes and transistors.

Figure 8B:
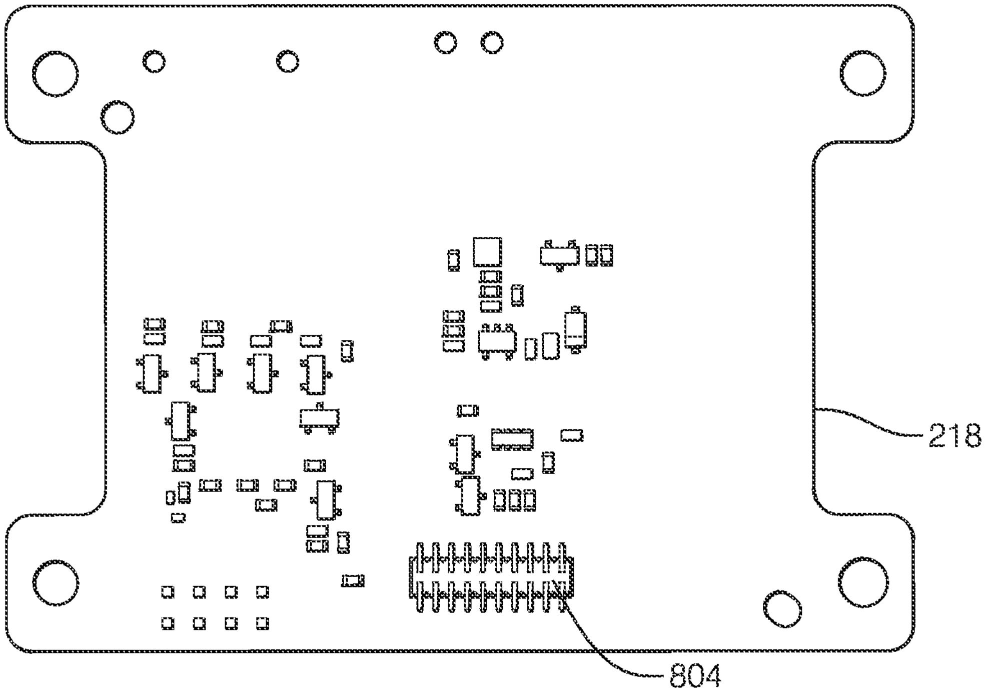
FIG. 8B illustrates a bottom view of the control circuit board of FIG. 8A according to some embodiments.

FIG. 8B illustrates a bottom view of the control circuit board 218. The bottom side of the control circuit board 218 includes a female pin board to board connector 804 that is configured to mate with the male pin board to board connector 702 on the power circuit board 204 as well as various other electronic components, such as resistors, capacitors, diodes and transistors.

Figure 9:
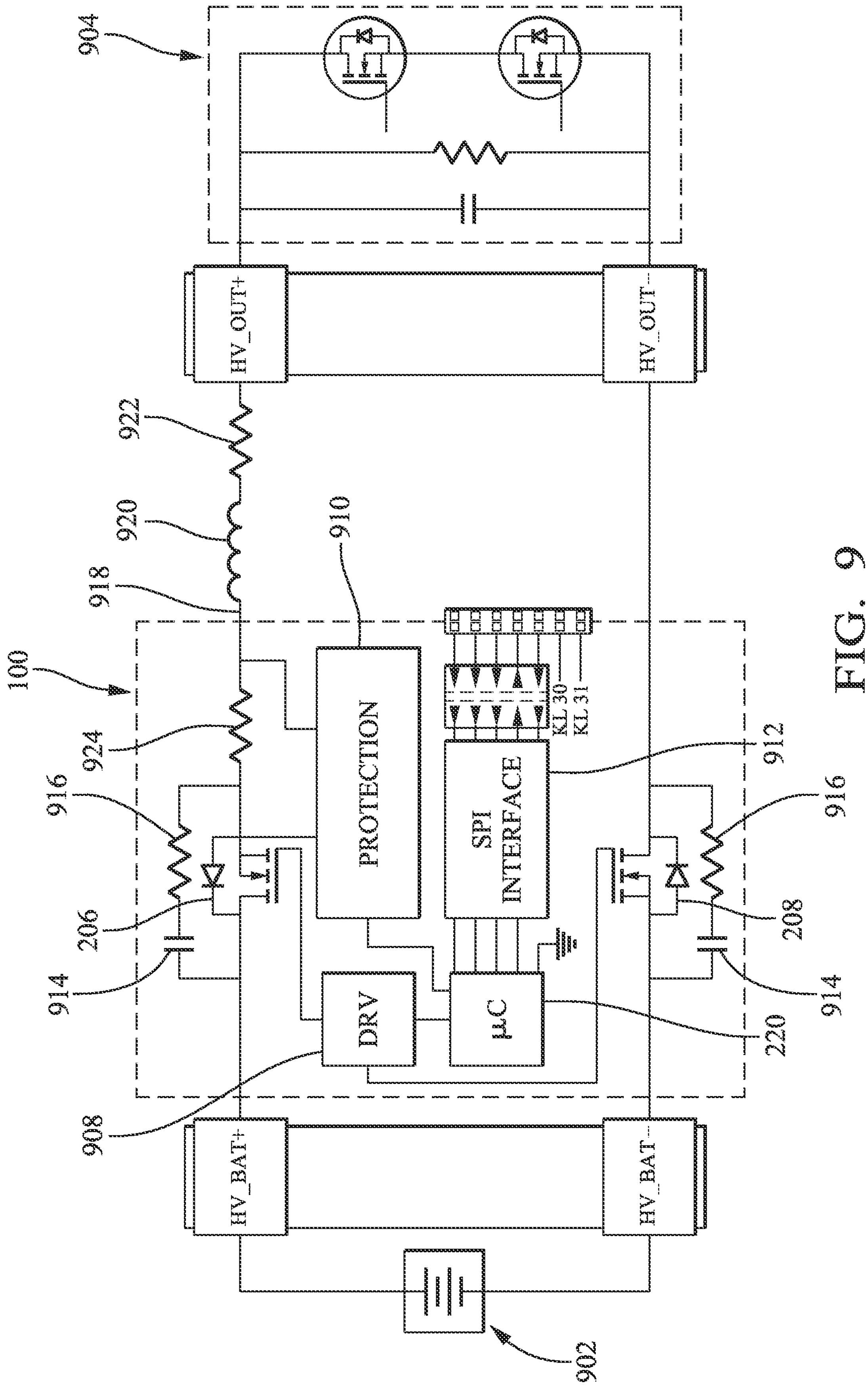
FIG. 9 illustrates a schematic electrical diagram of a miniature solid state relay (SSR) module according to some embodiments.

FIG. 9 shows a schematic electrical diagram of a non-limiting example of a miniature solid state relay module, hereafter referred to as the SSR module 100. The SSR module 100 is connected to an electrical power source, such as the battery 902, and an electrical load 904 as shown in FIG. 9. The SSR module 100 includes the solid state switch 206 and the solid state switch 208 controlled by the electronic controller 220, e.g., a microprocessor by means of a drive circuit 908. In alternative embodiments of the SSR module, the second solid state switch may be eliminated and replaced with an electrical conductor. The SSR module 100 also includes protection circuitry 910 connected to the drive circuit 908 to detect overcurrent conditions and communication circuitry 912 connected to the electronic controller 220 to provide digital communication between the SSR module and other electronic systems, e.g., electronic systems in an electric vehicle. The SSR module 100 further includes snubber circuits having a capacitive component 914 and a resistive component 916 connected in parallel with the solid state switch 206 and the solid state switch 208 to protect these switches. The SSR module 100 includes a connector 918 that connects the SSR module 100 to the electrical load 904. The connector 918 between the SSR module 100 and the electrical load 904 may have resistive and inductive properties modeled here by the inductive element 920 and the resistive element 922.

The SSR module 100 in this example is configured to have a normal operating voltage of around 420 volts and withstand voltage transients of around 600 volts. Alternative examples of the SSR module 100 may have different operating voltage ranges. Examples of the electrical load 904 may be a DC to AC invertor, a DC-DC convertor, or a primarily resistive load, e.g., a heater.

Figure 10:
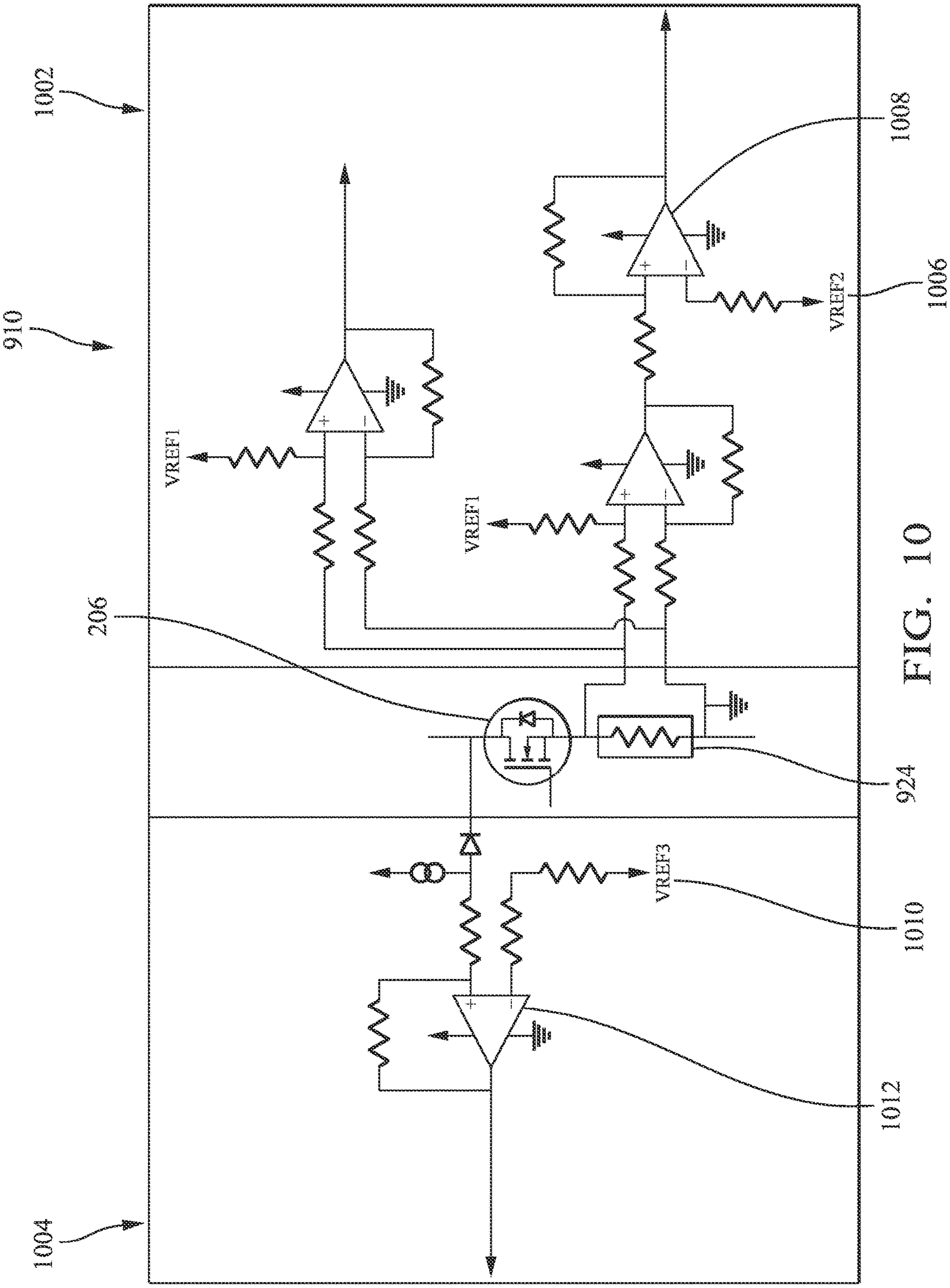
FIG. 10 illustrates a schematic electrical diagram of protection circuitry of the SSR module of FIG. 1 according to some embodiments.

FIG. 10 shows a detailed schematic electrical diagram of the protection circuitry 910 of the SSR module 100. The solid state switch 206 is connected to a shunt-based overcurrent detection circuit, hereafter referred to as the shunt OCD circuit 1002, and a desaturation-based overcurrent detection circuit, hereafter referred to as the DESAT OCD circuit 1004. Without subscribing to any particular theory of operation, the shunt OCD circuit 1002 detects an overcurrent condition by amplifying the voltage across a shunt resistor 924 shown in FIG. 9 as being in series with the solid state switch 206 and comparing it to a preset reference voltage 1006 using the shunt comparator 1008. The voltage measured across the shunt resistor 924 is representative of the current provided at the output of the SSR module 100. Without subscribing to any particular theory of operation, the DESAT OCD circuit 1004 detects an overcurrent condition by comparing the source to drain voltage of the solid state switch 206 to another preset reference voltage 1010 using the DESAT comparator 1012. The source to drain voltage of the solid state switch 206 has a substantial increase when an overcurrent condition occurs. This source to drain voltage increase depends on the characteristic of the MOSFET and the gate drive condition.

Discussion of Possible Embodiments

The following are non-exclusive descriptions of possible embodiments of the present invention.

In some aspects, the techniques described herein relate to a solid state relay module, including: a first solid state switch configured to establish and break an electrical connection between a first high-voltage input terminal and a first high-voltage output terminal disposed on a power circuit board; an electronic controller in communication with the first solid state switch and configured to put the first solid state switch in a conductive state or in a nonconductive state; a top cover formed of an electrically insulative thermoplastic material, wherein the power circuit board is disposed within a cavity defined by the top cover and wherein the top cover defines a plurality of openings through which the first high-voltage input terminal and the first high-voltage output terminal extend; a bottom cover formed of a thermally conductive material and in thermal communication with the first solid state switch; a compliant thermal interface paste disposed between an inner surface of the bottom cover and surfaces of the first solid state switch; and a resilient thermal interface pad attached to an outer surface of the bottom cover by a first adhesive layer on an inner surface of the resilient thermal interface pad.

The solid state relay module of the preceding paragraph can optionally include, additionally and/or alternatively any, one or more of the following features, configurations and/or additional components.

In some aspects, the techniques described herein relate to a solid state relay module, further including: a second solid state switch configured to establish and break an electrical connection between a second high-voltage input terminal and a second high-voltage output terminal disposed on the power circuit board.

In some aspects, the techniques described herein relate to a solid state relay module, wherein the first solid state switch and the second solid state switch are metal-oxide-semiconductor field-effect transistors.

In some aspects, the techniques described herein relate to a solid state relay module, wherein the bottom cover is formed of a material having a thermal conductivity of at least 50 watts/meter-° K.

In some aspects, the techniques described herein relate to a solid state relay module, wherein the resilient thermal interface pad includes a removable film layer attached to a second adhesive layer on an outer surface of the resilient thermal interface pad.

In some aspects, the techniques described herein relate to a solid state relay module, wherein a first opening in the plurality of openings is defined in a first side of the top cover and a second opening in the plurality of openings is defined in a second side of the top cover opposite the first side.

In some aspects, the techniques described herein relate to a solid state relay module, wherein the top cover defines a plurality of notches in the first and second sides of the top cover which are sized, shaped, and arranged to accommodate a plurality of busbars attached to the first high-voltage input terminal and the first high-voltage output terminal.

In some aspects, the techniques described herein relate to a solid state relay module, wherein the first high-voltage input terminal and the first high-voltage output terminal have a planar interface surface configured to contact one of the plurality of busbars.

In some aspects, the techniques described herein relate to a solid state relay module, wherein a threaded hole is defined in each of the planar interface surfaces which is configured to accept a threaded fastener extending through a hole in each of the plurality of busbars, thereby attaching the plurality of busbars to the first high-voltage input terminal and the first high-voltage output terminal.

In some aspects, the techniques described herein relate to a solid state relay module, wherein the electronic controller is disposed on a control circuit board separate from the power circuit board and in electrical communication with the power circuit board.

In some aspects, the techniques described herein relate to a solid state relay module, wherein the control circuit board includes a plurality of low-voltage terminals extending from the control circuit board and wherein the top cover defines an aperture through which the plurality of low-voltage terminals may be accessed.

In some aspects, the techniques described herein relate to a solid state relay module, wherein the plurality of low-voltage terminals are attached to the top cover via the control circuit board.

In some aspects, the techniques described herein relate to a solid state relay module, further including a drive circuit connected to the first solid state switch and the electronic controller, wherein the drive circuit is configured to put the first solid state switch in the conductive state or in the nonconductive state due to commands from the electronic controller.

In some aspects, the techniques described herein relate to a solid state relay module, further including: a shunt overcurrent detection circuit in communication with the electronic controller; and a desaturation overcurrent detection circuit in communication with the electronic controller, wherein the electronic controller is configured to command the drive circuit to put the first solid state switch in the nonconductive state when the shunt overcurrent detection circuit or the desaturation overcurrent detection circuit detects an overcurrent condition.

In some aspects, the techniques described herein relate to a solid state relay module, wherein the electronic controller is configured to command the drive circuit to put the first solid state switch in the nonconductive state less than 200 nanoseconds after the shunt overcurrent detection circuit detects an overcurrent condition.

In some aspects, the techniques described herein relate to a solid state relay module, wherein the electronic controller is configured to command the drive circuit to put the first solid state switch in the nonconductive state less than 150 nanoseconds after the shunt overcurrent detection circuit detects the overcurrent condition.

In some aspects, the techniques described herein relate to a solid state relay module, wherein the shunt overcurrent detection circuit detects the overcurrent condition when a load current exceeds a current threshold.

In some aspects, the techniques described herein relate to a solid state relay module, wherein the electronic controller is configured to command the drive circuit to put the first solid state switch in the nonconductive state less than 500 nanoseconds after the desaturation overcurrent detection circuit detects an overcurrent condition.

In some aspects, the techniques described herein relate to a solid state relay module, wherein the electronic controller is configured to command the drive circuit to put the first solid state switch in the nonconductive state less than 390 nanoseconds after the desaturation overcurrent detection circuit detects an overcurrent condition.

In some aspects, the techniques described herein relate to a solid state relay module, wherein the desaturation overcurrent detection circuit detects an overcurrent condition when a voltage across the first solid state switch exceeds a voltage threshold.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. A solid state relay module, comprising:

a first solid state switch configured to establish and break an electrical connection between a first high-voltage input terminal and a first high-voltage output terminal disposed on a power circuit board;

an electronic controller in communication with the first solid state switch and configured to put the first solid state switch in a conductive state or in a nonconductive state;

a top cover formed of an electrically insulative thermoplastic material, wherein the power circuit board is disposed within a cavity defined by the top cover and wherein the top cover defines a plurality of openings through which the first high-voltage input terminal and the first high-voltage output terminal extend;

a bottom cover formed of a thermally conductive material in thermal communication with the first solid state switch;

a compliant thermal interface paste disposed between an inner surface of the bottom cover and surfaces of the first solid state switch; and a resilient thermal interface pad attached to an outer surface of the bottom cover by a first adhesive layer on an inner surface of the resilient thermal interface pad.

2. The solid state relay module in accordance with claim 1, further comprising:

a second solid state switch configured to establish and break an electrical connection between a second high-voltage input terminal and a second high-voltage output terminal disposed on the power circuit board.

3. The solid state relay module in accordance with claim 2, wherein the first solid state switch and the second solid state switch are metal-oxide-semiconductor field-effect transistors.

4. The solid state relay module in accordance with claim 1, wherein the bottom cover is formed of a material having a thermal conductivity of at least 50 watts/meter-° K.

5. The solid state relay module in accordance with claim 1, wherein the resilient thermal interface pad comprises a removable film layer attached to a second adhesive layer on an outer surface of the resilient thermal interface pad.

6. The solid state relay module in accordance with claim 1, wherein a first opening in the plurality of openings is defined in a first side of the top cover and a second opening in the plurality of openings is defined in a second side of the top cover opposite the first side.

7. The solid state relay module in accordance with claim 6, wherein the top cover defines a plurality of notches in the first and second sides of the top cover.

8. The solid state relay module in accordance with claim 1, wherein the first high-voltage input terminal and the first high-voltage output terminal have a planar interface surface.

9. The solid state relay module in accordance with claim 8, wherein a hole is defined in each of the planar interface surfaces which is configured to accept a fastener.

10. The solid state relay module in accordance with claim 1, wherein the electronic controller is disposed on a control circuit board separate from the power circuit board and in electrical communication with the power circuit board.

11. The solid state relay module in accordance with claim 1, wherein the control circuit board includes a plurality of low-voltage terminals extending from the control circuit board and wherein the top cover defines an aperture through which the plurality of low-voltage terminals may be accessed.

12. The solid state relay module in accordance with claim 11, wherein the plurality of low-voltage terminals are attached to the top cover via the control circuit board.

13. The solid state relay module in accordance with claim 1, further comprising a drive circuit connected to the first solid state switch and the electronic controller, wherein the drive circuit is configured to put the first solid state switch in the conductive state or in the nonconductive state due to commands from the electronic controller.

14. The solid state relay module in accordance with claim 13, further comprising:

a shunt overcurrent detection circuit in communication with the electronic controller; and a desaturation overcurrent detection circuit in communication with the electronic controller, wherein the electronic controller is configured to command the drive circuit to put the first solid state switch in the nonconductive state when the shunt overcurrent detection circuit or the desaturation overcurrent detection circuit detects an overcurrent condition.

15. The solid state relay module in accordance with claim 14, wherein the electronic controller is configured to command the drive circuit to put the first solid state switch in the conductive state less than 200 nanoseconds after the shunt overcurrent detection circuit detects the overcurrent condition.

16. The solid state relay module in accordance with claim 15, wherein the electronic controller is configured to command the drive circuit to put the first solid state switch in the nonconductive state less than 150 nanoseconds after the shunt overcurrent detection circuit detects the overcurrent condition.

17. The solid state relay module in accordance with claim 15, wherein the shunt overcurrent detection circuit detects the overcurrent condition when a load current exceeds a current threshold.

18. The solid state relay module in accordance with claim 14, wherein the electronic controller is configured to command the drive circuit to put the first solid state switch in the nonconductive state less than 500 nanoseconds after the desaturation overcurrent detection circuit detects the overcurrent condition.

19. The solid state relay module in accordance with claim 18, wherein the electronic controller is configured to command the drive circuit to put the first solid state switch in the nonconductive state less than 390 nanoseconds after the desaturation overcurrent detection circuit detects the overcurrent condition.

20. The solid state relay module in accordance with claim 18, wherein the desaturation overcurrent detection circuit detects the overcurrent condition when a voltage across the first solid state switch exceeds a voltage threshold.

* * * * *